United States Patent
Corrigan et al.

(10) Patent No.: US 6,255,015 B1
(45) Date of Patent: Jul. 3, 2001

(54) MONOBLOCK BATTERY ASSEMBLY

(75) Inventors: Dennis A. Corrigan, Troy; Philippe Gow, Royal Oak; Lin R. Higley, Troy; Marshall D. Muller, Farmington; Anthony Osgood, Troy; Stanford R. Ovshinsky, Bloomfield Hills; Joshua Payne, Royal Oak; Rajeev Puttaiah, Troy, all of MI (US)

(73) Assignee: Ovonic Battery Company, Inc., Troy, MI (US)

( * ) Notice: Subject to any disclaimer, the term of this patent is extended or adjusted under 35 U.S.C. 154(b) by 0 days.

(21) Appl. No.: 09/139,384

(22) Filed: Aug. 23, 1998

(51) Int. Cl.[7] ................................................. H01M 6/42
(52) U.S. Cl. ..................... 429/149; 429/120; 429/156; 429/71; 429/163
(58) Field of Search ..................... 429/149, 152, 429/156, 160, 148, 120, 153, 154, 71, 73, 72, 163, 176, 223

(56) References Cited

U.S. PATENT DOCUMENTS

| | | | |
|---|---|---|---|
| 4,720,440 | * | 1/1988 | Yonezu et al. ........................ 429/57 |
| 4,724,190 | * | 2/1988 | Siga et al. .......................... 429/158 |
| 5,344,725 | * | 9/1994 | Ide et al. ............................ 429/160 |
| 5,356,735 | | 10/1994 | Meadows . |
| 5,800,942 | * | 9/1998 | Hamada et al. ..................... 429/148 |
| 5,879,831 | * | 3/1999 | Ovshinsky et al. ................... 429/54 |
| 5,895,728 | * | 4/1999 | Walker et al. ....................... 429/53 |
| 5,906,899 | * | 5/1999 | Noda et al. ......................... 429/149 |
| 6,004,689 | * | 3/1999 | Walker et al. ....................... 429/53 |

* cited by examiner

*Primary Examiner*—Gabrielle Brouillette
*Assistant Examiner*—R. Alejandro
(74) *Attorney, Agent, or Firm*—Philip H. Schlazer; Marvin S. Siskind; David W. Schumaker (57) ABSTRACT

A multiple cell monoblock battery in which a plurality of electrochemical cells are disposed in a plastic or metal case and each of the cells includes an enclosure providing for gas to exit while preventing electrolyte to exit the enclosure. A novel integral system of flow channels allows liquid coolant to flow between adjacent cells. Other special features, such as cell interconnections are described.

26 Claims, 4 Drawing Sheets

MONOBLOCK BATTERY ASSEMBLY

FIELD OF THE INVENTION

The instant invention relates generally to improvements in rechargeable high capacity batteries, modules and packs. Specifically, the invention relates to multi-cell, monoblock batteries, electrical interconnections between individual cells, and electrolyte enclosures for individual cells.

BACKGROUND OF THE INVENTION

Rechargeable prismatic batteries are used in a variety of industrial and commercial applications such as fork lifts, golf carts, uninterruptable power supplies, and electric vehicles.

Rechargeable lead-acid batteries are presently the most widely used type of battery. Lead-acid batteries are a useful power source for starter motors for internal combustion engines. However, their low energy density, about 30 Wh/kg, and their inability to reject heat adequately, makes them an impractical power source for an electric vehicles, hybrid electric vehicles and 2–3 wheel scooters/motorcycles. An electric vehicle using lead acid batteries has a short range before requiring recharge, require about 6 to 12 hours to recharge and contain toxic materials. In addition, electric vehicles using lead-acid batteries have sluggish acceleration, poor tolerance to deep discharge, and a battery lifetime of only about 20,000 miles.

Nickel metal hydride batteries ("Ni-MH batteries") are far superior to lead acid batteries, and Ni-MH batteries are the ideal battery available for electric vehicles and other forms of vehicular propulsion. For example, Ni-MH batteries, such as those described in copending U.S. patent application Ser. No. 07/934,976 to Ovshinsky and Fetcenko, the disclosure of which is incorporated herein by reference, have a much higher energy density than lead-acid batteries, can power an electric vehicle over 250 miles before requiring recharge, can be recharged in 15 minutes, and contain no toxic materials. Electric vehicles using Ni-MH batteries have demonstrated exceptional acceleration, and a battery lifetime of more than about 100,000 miles.

Extensive research has been conducted in the past into improving the electrochemical aspects of the power and charge capacity of Ni-MH batteries, which is discussed in detail in U.S. Pat. Nos. 5,096,667 and 5,104,617 and U.S. patent application Ser. Nos. 07/746,015 and 07/934,976. The contents of all these references are specifically incorporated by reference.

Ovonic Battery Company has developed high energy and high power nickel-metal hydride batteries with capacities ranging from 90 to 150 Ah for electric vehicle applications, and from 30–60 Ah for hybrid electric vehicle applications. Presently, for some applications, such as power assist HEV, even smaller capacities ranging from 5 to 20 Ah, are needed.

However, the aspect ratio of the electrodes of the battery becomes unfavorably wide when very short cans are employed. Therefore, for single cells of footprints suitable for EV size batteries (about 50 to 100 Ah) the practical lower limit on the capacity is around 25–30 Ah. To achieve high power HEV batteries of about 20 Ah, a smaller footprint can has been used, and it is projected that a smaller can would provide batteries of about 12–15 Ah. However, these smaller cells do not provide improvements in specific power or specific energy. In fact, the specific power and specific energy as well and power and energy densities decrease with lower size cans unless the electrode tab arrangements and cell hardware are redesigned and re-optimized.

The biggest problem with small batteries of the current prismatic battery design is that the cost per unit stored energy (specific cost) increases as the size decreases. This is because the cost of cell hardware components does not necessarily scale with size. Some costs are more related to the number of parts employed, which generally does not decrease at all with smaller batteries. For this reason, new battery designs are needed.

Additionally, it should be noted that until recently the mechanical and thermal aspects of the performance of Ni-MH batteries have been neglected. For example, in electric vehicles, the weight of the batteries is a significant factor because battery weight is the largest component of the weight of the vehicle. For this reason, reducing the weight of individual batteries is a significant consideration in designing batteries for electric powered vehicles. In addition to reducing the weight of the batteries, the weight of battery modules must be reduced, while still affording the necessary mechanical requirements of a module (i.e. ease of transport, ruggedness, etc.). Also, when these battery modules are incorporated into battery pack systems (such as for use in electric vehicles) the battery pack components must be as light weight as possible.

It should be particularly noted that electric vehicle applications introduce a critical requirement for thermal management. This is because individual cells are bundled together in close proximity and many cells are electrically and thermally connected together. Therefore, since there is an inherent tendency to generate significant heat during charge and discharge, a workable battery design for electric vehicles is judged by whether or not the generated heat is sufficiently controlled.

Sources of heat are primarily threefold. First, ambient heat due to the operation of the vehicle in hot climates. Second, resistive or $I^2R$ heating on charge and discharge, where I represents the current flowing into or out of the battery and R is the resistance of the battery. Third, a tremendous amount of heat is generated during overcharge due to gas recombination.

While the above parameters are generally common to all electrical battery systems, they are particularly important to nickel-metal hydride battery systems. This is because Ni-MH has such a high specific energy and the charge and discharge currents are also high. For example, to charge a lead-acid battery in one hour, a current of 35 Amps may be used while recharge of a Ni-MH battery may utilize 100 Amps for the same one-hour recharge. Second, because Ni-MH has an exceptional energy density (i.e. the energy is stored very compactly) heat dissipation is more difficult than lead-acid batteries. This is because the surface-area to volume ratio is much smaller than lead-acid, which means that while the heat being generated is 2.5 -times greater for Ni-MH batteries than for lead acid, the heat dissipation surface is reduced.

The following illustrative example is useful in understanding the thermal management problems faced when designing Ni-MH battery packs for electric vehicles. In U.S. Pat. No. 5,378,555 to General Motors (herein incorporated by reference), an electric vehicle battery pack using lead acid batteries is described. The battery pack system, utilizing lead-acid batteries, has a capacity of about 13 kWh, weighs about 800 pounds, and has a vehicle range of about 90 miles. By replacing the lead-acid battery pack by an Ovonic battery pack of the same size, the capacity is increased to 35 kWh and vehicle range is extended to about 250 miles. One implication of this comparison is that in a 15 minute recharge, the power supplied to the Ni-MH battery pack is 2.7 times greater than that supplied to the lead-acid battery pack, with its commensurate added heat. However, the situation is somewhat different during discharge. To power a vehicle on the highway at constant speed, the current draw upon the battery is the same whether it is a Ni-MH battery or a lead-acid battery (or any other power source for that matter). Essentially the electric motor which drives the vehicle does not know or care where it gets the energy or what type of battery supplies the power. The difference between the heating of the Ni-MH battery and the lead-acid battery upon discharge is the length of discharge. That is, since the Ni-MH battery will drive the vehicle 2.7 times farther than the lead-acid, it has a much longer time before it has a chance to "cool-off".

Further, while the heat generated during charging and discharging Ni-MH batteries is normally not a problem in small consumer batteries or even in larger batteries when they are used singly for a limited period of time, large batteries that serve as a continual power source, particularly when more than one is used in series or in parallel, such as in a satellite or an electric vehicle, do generate sufficient heat on charging and discharging to affect the ultimate performance of the battery modules or battery pack systems.

Thus, there exists a need in the art for battery, battery module, and battery pack system designs which reduces the overall weight thereof and incorporates the necessary thermal management needed for successful operation in electric vehicles, without reducing its energy storage capacity or power output, increases the batteries' reliability, and decreases the cost.

Simply stated, the prior art does not teach an integrated battery configuration/internal design, battery module, and thermally managed battery pack system which is light weight, simple, inexpensive, and combines the structural support of the batteries, modules and packs with an air or water cooled thermal management system.

SUMMARY OF THE INVENTION

Disclosed herein is a multi-cell, monoblock battery comprising: a battery case; and a plurality of electrochemical cells, the plurality of electrically interconnected cells disposed within the battery case, each electrochemical cell comprising: a) at least one positive electrode; b) at least one negative electrode; c) separators, electrically isolating the positive and negative electrodes, but allowing for transport of ions between the positive and negative electrodes; d) electrolyte surrounding and wetting the electrodes and the separator; and e) an enclosure surrounding and enclosing the electrodes, the separator and the electrolyte; the enclosure having an opening sized to allow the passage of both gas and electrolyte; the opening further including hydrophobic means to isolate the electrolyte of each cell while allowing the gas generated by each individual cell to exit from the enclosure of that cell.

The multicell, monoblock battery may further include a base, a case lid, and battery terminals. The battery terminals provide the electrical connection to said interconnected electrochemical cells within the case. The terminals can be formed of a metal foil material electrically connected to said interconnected cells through said case lid. The metal foil may be comprised of a copper/nickel laminated foil material.

In the preferred embodiment, the battery case is formed of plastic, although stainless steel forms another preferred embodiment. The electrochemical cells which make up the multicell, monoblock battery are nickel metal hydride cells wherein the negative electrode of each cell is formed of hydrogen storage material and the positive electrodes of each cell are formed of nickel hydroxide material. The battery case lid includes a non-conductive material to isolate battery terminals from the case if the case is made of a conductive metal material. The non-conductive material preferably is formed of a phenolic glass material attached to the case lid by an adhesive. The enclosure is formed from a non-conductive polymeric material which is inert to the electrochemical environment of the battery. The non-conductive polymeric material preferably comprises polypropylene. Each of the plurality of electrochemical cells includes a plurality of positive electrodes and a plurality of negative electrodes, and each enclosure includes an opening through which battery gas is permeable but battery electrolyte is not.

In another preferred embodiment of this invention, there is disclosed a multi-cell, plastic monoblock battery, the battery comprising: a battery case having four integrally formed side walls, an integrally formed base, and an upper lid; and a plurality of electrically interconnected electrochemical cells disposed within the battery case, each of the plurality of electrochemical cells comprising: a) at least one positive electrode; b) at least one negative electrode; c) separators, electrically isolating the positive and negative electrodes, but allowing for transport of ions between the positive and negative electrodes; and d) electrolyte surrounding and wetting the electrodes and the separator; the battery case comprising: a plurality of individual enclosures into which cells are operatively disposed such that the electrolyte of each of the cells is isolated from all other of the cells while the gas from each of the cells exits from the enclosure into the battery case; a plurality of interconnected coolant channels, the coolant channels disposed between and in thermal contact with at least two of the electrochemical cells, and coolant flowing through the coolant channels.

Gas evolved from each cell is shared in a common pressure vessel inside the case. A least one pressure vent is used to provide pressure release for the evolved gas. A gas permeable hydrophobic material can be used to prevent electrolyte communication between cells.

A plurality of cells may be serially interconnected through the enclosures thereof via current collection tabs by welding the tabs of the positive electrodes of one cell to the negative electrodes of an adjacent cell. The connectors preferably are formed of nickel, more preferably nickel and copper. The interconnections are sealed by an EDPM rubber gasket which may include a hot melt adhesive or an epoxy adhesive.

Also disclosed herein is a fluid cooled, plastic battery case comprising a plurality of electrochemical cells, the improvement comprising: passing coolant from a coolant channel in the bottom of the plastic case up through coolant channels which cool a portion of one surface of at least one electrochemical cell, across the surface and down through coolant channels which cool the remainder of the one surface of the at least one cell, and out to another coolant channel in the bottom of the plastic case.

Also disclosed herein is a high capacity, high energy battery module including a plurality of individual prismatic electrochemical cells, enclosed within a case, at least two sets of two the cells being electrically interconnected in parallel and each of the sets of parallel interconnected cells being electrically interconnected to each other in series.

Also disclosed herein is a plastic monoblock prismatic battery case, the case having a plurality of individual electrochemical cells electrically interconnected and operatively disposed therewithin; the case having integrally formed side and bottom walls, the improvement comprising: at least one insertable partition adapted to be operatively disposed between two side walls of the case so as to cooperate with the walls of the case or other partitions to form an enclosure of one or more cells.

DETAILED DESCRIPTION OF THE INVENTION

Disclosed herein is a multi-cell, monoblock battery. The battery contains a plurality of electrochemical cells in single pressure vessel or battery case. The electrolyte of each cell is isolated from the remaining cells and the single battery can acts as an enclosure for the cells and as a single pressure/gas container. The instant battery design has many advantages. The inventive design allows for the batteries having a fraction of the current capacity of conventional batteries to be assembled with conventional cell cans, hardware and electrodes. Further, the design retains the high specific energy of conventional designs. Additionally, the specific power of the design can be increased over conventional designs by using an opposed electrode tab design (discussed hereinbelow). The specific cost of the instant design in $/kWh is lower than that of conventional design due to reduced hardware costs lower parts costs. Also, the development time for batteries using the inventive design is reduced over the development time of conventional batteries because pre-existing components can be used. Finally, batteries of the inventive design can be assembled into modules and packs with existing module and pack designs and hardware.

Production of such a multi-cell battery in a conventional steel can is conceptually straight forward. However, when the specifics of construction are addressed, some specific problems arose, for which the instant inventors devised solutions. The basic inventive battery design employs multiple cells in a single stainless steel can. The electrical leads of the cells are connected internally in series to provide a sum of the single cell voltages to the can terminals. There are only two external terminals on the can, as with current conventional cell design. To avoid self-discharge electrical shorting paths between the cells, the electrolyte of each cell is isolated from the other cells. Thus, the individual cell stacks need to be electrochemically isolated from each other except for the electrical connections. The single can serves as a pressure vessel for each cell.

The simplest way to make multi-cell single-can batteries is to prepare several partial electrode stacks, insert them into plastic bags, weld the resulting stacks in series, insert the cells into the can and weld the end cells to the can terminals. One problem with this design is the possibility of leakage of cell electrolyte from one cell to another and into the common can. Possible places for electrolyte leakage to occur are at the tops of the cell containment bags, where gases escape from the cells, and the cell interconnection weld joints, when such weld occur through the cell containment bags.

Figure 1:
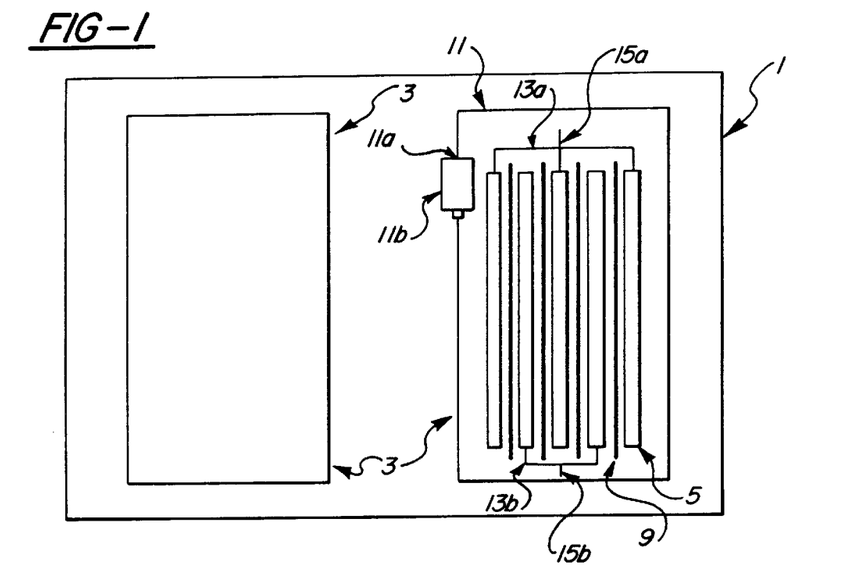
FIG. 1 is a planar side view of a single battery case having a plurality of electrochemical cells disposed therein.

FIG. 1 shows a simplified diagram of an embodiment of the multi-cell monoblock battery of the present invention. FIG. 1 shows a single battery case 1. Disposed within the battery case 1 is a plurality of electrochemical cells 3. Each of the electrochemical cells 3 comprises at least one positive electrode 5 and at least one negative electrode 7. Each cell further comprises separators 9 which electrically isolate the positive electrodes from the negative electrodes but allow for the transport of ions between the positive and negative electrodes. Each cell further comprises electrolyte which surrounds and wets the electrodes and the separators within the cell. Each cell further comprises a cell enclosure 11 which surrounds and encloses the electrodes, the separators and the electrolyte within the cell.

The battery case may comprise a case can, a case lid, and battery terminals. The battery terminals provide electrical connection to the electrically interconnected cells within the case. The battery terminals may comprise a metal foil materials electrically connected to the interconnected electrochemical cells within the case, through the case lid. The metal foil material may comprise a copper/nickel laminated foil material.

The battery case may be formed from plastic. Alternatively, the battery case may be formed from stainless steel. The battery case lid may include a non-conductive material to isolate the battery terminals from the stainless steel case. The non-conductive material may comprise phenolic glass material. The phenolic glass material may be attached to the case lid by an adhesive.

The cell enclosure 11 may comprise a non-conductive polymer material which is inert to the electrochemical environment of the battery. This non-conductive polymer may comprise polypropylene. It may further comprise strength enhancing filler. The cell enclosure 11 isolates the electrolyte of each cell from the electrolyte of all the other cells in the battery. However, the enclosure permits gasses generated from that cell to pass into the battery case. This may be accomplished by placing an opening 11a in the cell enclosure which is sized to allow the passage of both gas and electrolyte. The opening is covered by a hydrophobic 11b means to prevent passage of the electrolyte (thus isolating the electrolyte of each cell) while allowing the gas generated by each individual cell to exit from the enclosure of that cell. Preferably, the hydrophobic means is a hydrophobic material which permits gas to exit from the enclosure but which prevents electrolyte from passing through. An example of a hydrophobic material is a material comprising polyethylene with calcium carbonate filler. The hydrophobic material preferably has a gas diffusion surface area sufficient to accommodate the overcharge gas evolution rate. The surface area may be between about 5 cm$^2$ and about 50 cm$^2$ for a 12 Ah capacity electrochemical cell.

FIG. 1 also shows current collection tabs 13a and 13b connected to each of the positive and negative electrodes. In FIG. 1, the tabs 13a are connected to each of the positive electrodes, and the tabs 13b are connected to each of the negative electrodes. All of the current collection tabs 13a that are connected to the positive electrode are joined together to form a "positive interconnect" 15a. As well, all of the negative tabs 13b are joined together to form a "negative interconnect" 15b. Preferably, the tabs are mechanically joined together by welding.

Figure 2:
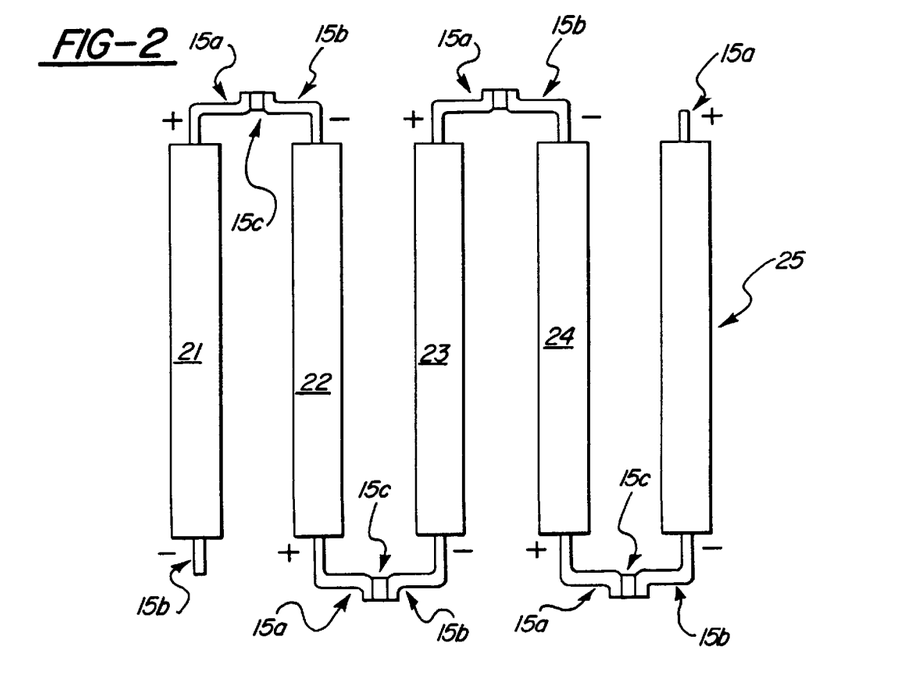
FIG. 2 is a planar side view illustrating a battery case of the instant invention in which five electrochemical cells are serially interconnected.

As noted, the individual electrochemical cells are electrically interconnected. In general, each cell may electrically connected to another cell either in series or in parallel. Preferably, all of the cells are serially electrically connected together. Generally, the electrochemical cells are electrically connected in series through the enclosures by electrically connecting the positive interconnect of one cell to the negative interconnect of the next cell. A serial interconnection between cells is shown in FIG. 2. FIG. 2 shows five electrochemical cells 21, 22, 23, 24, 25 that have been serially interconnected together. As serial interconnection is achieved by connecting the positive interconnect 15a of the first cell 21 to the negative interconnect 15b of the second cell 22. The positive interconnect of the second cell 22 is electrically connected to the negative interconnect of the third cell 23, as so on.

Preferably, the positive and negative interconnects 15a and 15b are electrically connected by welding the interconnect together. A "connection spacer" 15c may be welded between the interconnects to provide distance between adjacent electrochemical cells. The connection spacer 15c may comprise nickel, copper, a nickel alloy, a copper alloy, a nickel-copper alloy, a copper-nickel alloy. Further the connection spacer may comprise both copper and nickel. For example, the connection spacer may comprise nickel-plated copper, or the connection spacer may comprise a copper control portion surrounded by nickel. Alternatively, the connector may comprise a copper cylinder wrapped along the length thereof with nickel wire. The electrical connection is accomplished through the cell enclosures. The region where the interconnects are joined together is called the "interconnection region". It is possible that electrolyte can escape from each cell enclosure at the interconnection region. To prevent the escape of electrolyte, each cell enclosure is sealed at the interconnection region by an "interconnection region seal". The interconnection region seal may include a polymer gasket such as an EDPM rubber gasket. Furthermore, the interconnection region seal may be selected from the group consisting of a hot melt adhesive, and an epoxy adhesive.

The electrochemical cells may be nickel-metal hydride cells. In this case the negative electrodes of each cells are formed of hydrogen storage material and the positive electrodes of each cell are formed of nickel hydroxide material.

EXAMPLE 1

A 3-cell battery was assembled into a single stainless steel can. Each cell consisted of an electrode stack inserted into a separate polypropylene bag. The electrolyte in each cell was isolated by the plastic bag which was modified with a barrier of hydrophobic material at the top of each cell. The 3-cell battery shared a single can, a single vent, and a single set of terminals. Inter-cell connections inside the can were made by TIG welding the welded tab bundles of each cell together in series. The welded tab connectors of the outer cells were TIG welded to the can terminals.

Each electrode stack consisted of 6 positive and 7 negative electrodes. The positive electrodes consisted of nickel hydroxide powder pasted into foamed nickel substrates. The positive electrodes were 31 mil thick and weighed about 30 grams each. The designed positive capacity of each cell was about 30 Ah. The negative electrode consisted of MF-139Z metal hydride alloy (nominal composition in at. % Ti 9.0%, Zr 27.0%, V 5.0%, Ni 38.0%, Cr 5.0%, Mn 16.0%) on nickel substrates. The negative electrodes were 14 mil thick and weighed about 23.3 grams each. The designed negative capacity of the cells was about 50 Ah, yielding a design stoichiometric ratio of 1.7:1.0 negative to positive. Thick, 50 g/m$^2$, separators placed around both the positive and negative electrodes. The electrolyte fill volume was 2.3 g/Ah×30 Ah=69 g of 30 weight % KOH per cell.

Electrolyte isolation was achieved by enclosing the individual cells in separate 8 mil polypropylene bags. The cells were welded in series in an over the wall configuration. That is, the electrode tabs of the individual cells were welded in series above the tops of the polyethylene bags. To prevent electrolyte leakage from the tops of the bags, and yet allow for gas to escape, highly hydrophobic, gas-permeable, heat-sealable film material was laminated to the top third of each polyethylene bag. Three heat seal lines were used to give strength and guaranteed sealing around the top of the bags. A second barrier was inserted over the tab area to prevent electrolyte from creeping up and over the nickel tabs of the electrodes. A polyethylene tube was slotted and forced over the tab weld area and allowed to clamp to the top of the bag around the interconnect area. The tube was filled with epoxy to seal the tab area and the top of the bag area completely.

The electrolyte was added to each cell by syringe and allowed to soak into the separator and plates. The battery was then vacuum pumped to drive the KOH further into the void areas of the electrodes. After final addition of KOH, a roll of hydrophobic heat-sealable film was inserted onto the tops of each cell as a rejection area to minimize electrolyte well-up or line of sight splashing.

The battery was welded closed and a septum vent installed. The battery was then compressed to 1650 pounds and heat-treated for 3 days at 60° C. After heat treatment, the compression was reduced to 50 psi and the battery was formed using standard electrical charge formation procedures.

Two triple-cell batteries were built according to the fabrication process described above. After formation, the open circuit voltage of the multi-cell, single-can batteries was over 4V, indicating three cells in series. The batteries were discharged at C/3 to 2.7 V or 0.9 V per cell and then further discharged at C/10 to 0.9 V or 0.3 V per cell. The discharge curves resemble the discharge curve of a NiMH cell with a midpoint voltage of 3.67 V, triple the 1.22 V midpoint voltage of the single cell control. The discharge capacity was 29–30 Ah, in good agreement with the design capacity of 30 Ah. The behavior thus resembles the discharge of three 30 Ah cells in series. In both batteries, all three cells acted together and the state of the charge was well balanced between cells. It is important to note that the discharge curves showed no secondary plateaus indicative of out-of-balance cells. The specific energy was slightly lower than a comparable single cell, mainly because the stoichiometric ratio in the triple-cell can batteries was higher due to design details.

The ac impedance of the triple-cell can batteries was 5.2 mohm in comparison to 0.7 mohm in the control cell. Theoretically, the impedance of 90 Ah each cell should be slightly over 3 times that of the 100 Ah control cell. Since the three cells in each multicell can are in series, the triple-cell can batteries should be over 3×3=9 times that of the control cell or 9×0.7=6.3 mohm. The actual impedance was slightly lower at 5.2 mohm showing excellent power performance should be expected for this design.

The specific power performance derived from pulse power tests was 194–207 W/kg at 50% DOD and 163–180 W/kg at 80% DOD. This power performance is comparable or slightly higher than that observed on the control cells of 190 W/kg at 50% DOD and 160 W/kg at 80% DOD.

The discharge curves before and after open circuit stand showed smooth discharge curves with no secondary plateaus indicative of out-of-balance cells. The self-discharge rate was 7–12% over 48 hours, comparable to that of the control cells of around 9% with MF139z alloy. If electrolyte communication between cells provided shorting paths, state-of-change imbalances would be expected after self-discharge. This demonstrates good electrical isolation between cells.

The multicell can batteries were subjected to several dozen charge-discharge cycles during formation, conditioning, minicycling, and testing. The capacity developed normally during these cycles with no sign of failure due to electrolyte shorting pathways.

With the success of the first set multi-cell batteries the inventors looked at new concepts to improve on the basic concept. One of the important techniques used is a so called "through the wall" cell connection. The costly terminal is replaced with an interconnect strap welded "through the wall" directly to an internal strap. A standard lid and vent assembly is used to make a metal/plastic laminate part using a sandwich of composite phenolic glass bulkhead panels epoxied over the current terminal hole.

The previous cells had open top bags with "over the wall" connections. These worked quite well, but there was a measurable conductivity from can to terminal and one of the cells has a slightly higher self-discharge than the others. This inconsistency could well be controllable when more than two batteries are made (process variability reduction), but as an improvement it was deemed important to completely seal each cell in a pouch which completely isolates all battery components electrochemically. This is possible only with functional "through the wall" connections and seals.

EXAMPLE 2

A 3-cell battery was assembled into a single stainless steel can. Each cell consisted of an electrode stack inserted into a separate polypropylene bag. The electrolyte in each cell was isolated by a polyethylene bag, incorporating a gas membrane sub assembly heat-sealed at the top of each cell. The gas membrane sub-assembly is designed with a gas diffusion surface area of 50 cm$^2$ or more. Each assembly was made by heat-sealing membrane material to a polyethylene sheet and forming into a piece to insert into the cell. The 3-cell battery shared a single can, a single vent, and a single set of copper/nickel laminated foil terminals. Inter-cell connections inside the can were made by welding buttons made up of pre-welded 0.005" Ni foil tab material through the bags and sealing with an EPDM rubber gasket. The outer cells were welded in the same fashion through the lid to the laminate foil terminals.

The electrode stacks were assembled and inserted into polyethylene standard bags that had 0.25" holes punched in the region centered upon the tabs. The bags were aligned to the adjacent cells and the holes were centered to the positive and negative tabs. The button was pushed through an EPDM Washer and placed between the bag walls. This assembly of positive tab stack, button, bag, EPDM washer, bag, and negative tab stack was then resistance welded into at most a 0.07 milli-ohm connection. The final connection of the three-cell stack was from the tab through the wall of the bag with an EPDM rubber washer to a layered 0.005" alternating Ni/Cu strap to the lid. This strap was then through the wall welded to a outside inter-cell connector, using a similarly constructed Ni button which was adjusted for the thicker lid connection. The composite lid was made using standard phenolic glass circuit board material laminated on both the inside and outside of a standard stainless steel lid. This was accomplished by cutting two squares of the circuit board that fit on both sides of the raised square area in the lid where the standard terminal hole is located. The area around the hole is completely sealed with epoxy and a 0.25" hole is drilled. The positive and negative inter-cell straps are welded "through the wall" to become the batteries "flag", or external, terminals. A ring is placed around the base of the "flag" terminal, locked in place as a dam, and flooded with epoxy until it covers the weld area.

Each electrode stack contained 6 positives and 7 negatives of M-108 size. The positives consisted of commercial nickel hydroxide powder pasted onto foamed nickel substrates. The positive electrodes were 31 mil thick and weighed approximately 18 gr. each. The design capacity of each cell was 18.9 Ah. The negatives contained MF-139Z on copper substrate. They were 14 mil thick and weighed 13.5 grams each. The design negative capacity of each cell was 28.1 Ah, yielding a design stoichiometric ratio of 1.49. Thin 30 g/m$^2$ separators were used on both the positive and negative electrodes. The fill volume was 2.0 g/ah×19 Ah=38 g of 30 w/o KOH per cell.

Electrolyte isolation was achieved by enclosure of each individual cell into a separate 8 mil plastic bag. Highly hydrophobic heat-sealable film was used as a gas diffusion barrier. The film was sealed to the bags and a series of gas channels were introduced to allow gas passage from the cell to the common pressure container.

The electrolyte was added to each sub-cell by syringe and allowed to soak into the separator and plates. The battery was then vacuum pumped to drive the KOH further into the void areas. After final addition of KOH, the fill hole of each cell was heat-sealed, the battery TIG welded, and a spring vent installed. The battery was then compressed to 800 pounds and heated treated for 3 days at 60° C. Compression was released to about 50-psi and the battery formed using a standard formation procedure.

After formation, the open circuit voltage of the triple-cell battery was over 4V, indicative of three cells in series. The battery was discharged at C/3 to 2.7 V, or 0.9 V per cell. The discharge curve is comparable to a standard curve with a midpoint voltage of 3.74 V. The capacity of the battery was 18.9 Ah which is in good agreement with the design capacity of 19 Ah. The energy density is lower than a comparable control cell due to the non-optimized design of the battery. There is significant dead volume and excess weight to give room for the new gas membrane.

The ac impedance of the battery was 4.8 mohm in comparison to 0.37 mohm in the control hybrid cell. Theoretically, the impedance of each 18 Ah cell should be three times that of the 60 Ah control cell. Since the three cells in the can are in series, the total impedance should be 3×3=9 times that of the control cell, or 9×0.37=3.33 m ohm. In actuality, the impedance is also a function of the number of electrodes in each cell. The hybrid control cell has 24 electrode pairs, while the multi-junction battery has only 18 electrode pairs. Thus, the total impedance should be 3.33×

24/18=4.44 mohm. Other contributions to the overall power are in the cell design. The experimental design was set up to look at new design features, such as through the wall welding, and the gas membrane isolation.

In spite of the higher impedance, the actual power performance revealed an increase in watts per electrode pair. The performance derived from equivalent power tests were 290 W/kg at 50% DOD and 233 W/kg at 80%. The control cell exhibited 312 W/kg at 50% DOD and 236 W/kg at 80% at the same stage of cycling. A summary of the power performance is shown in Table 4.

The triple-cell can battery was subjected to 48 hours of open circuit stand tests. The discharge curve, before and after open circuit, show smooth discharge curves. The self-discharge rate was 9.6%, which is comparable to the control cells of around 9% with MF-139z alloy. Each cell is electrochemically isolated from each other so no charge imbalance is expected from shunt currents through the electrolyte.

The triple cell can was subjected to more than 60 cycles during formation, conditioning, mini-cycling, and testing. The capacity during these discharge cycles developed normally, with no sign of hardware or other failure due to electrolyte leakage from the cells.

During the assembly it is possible to punch a hole in the polyethylene materials used for the cell enclosure bag. This may be avoided by implementing a new bag material, which is heat-sealable and has increased puncture resistance. Some of the new shopping bag materials and polyurethane films have been designed with puncture resistance as their main functional criteria. These new materials should be evaluated as a replacement for the soft polyethylene currently used.

In addition to the multi-cell, monoblock battery described in Example 1 and Example 2, disclosed herein is another example of a multi-cell, monoblock battery which comprises a plurality of electrochemical cells disposed in a single battery case. In this example, the monoblock battery comprises a uniquely designed battery case referred to herein as a "monoblock case". The monoblock case is preferably formed of a plastic material. The plastic material is preferably a material which is resistant to corrosion from the electrolyte. The monoblock case has four integrally formed side walls, an integrally formed base, and an upper lid.

The monoblock case comprises a plurality of individual enclosures into which electrochemical cells are operatively disposed so that the electrolyte of each cells is isolated from the other cells while the gas from each of the cells exits from the enclosure into the monoblock battery case. (Hence, the gasses from each individual cell are shared in a common pressure vessel within the battery case). The monoblock case further comprises a plurality of interconnected coolant channels. The coolant channels are disposed between and are in thermal contact with at least two of the electrochemical cells. Coolant flows through the coolant channels.

The coolant channels may be fluidly interconnected through "bottom coolant channels" located in the bottom of the monoblock base. The bottom coolant channels may be integrated into the bottom of the base.

Figure 3A:
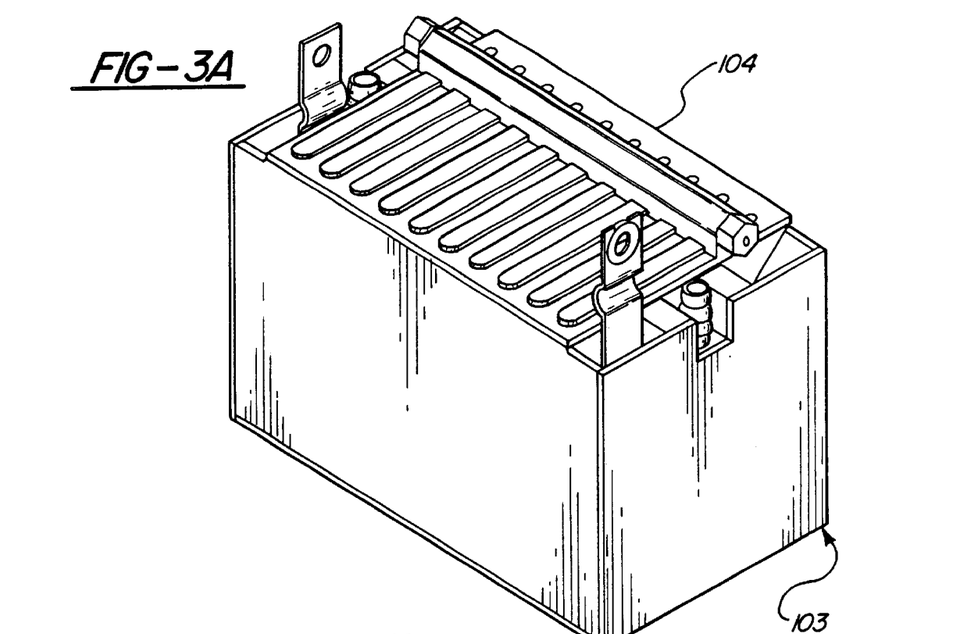
FIG. 3a is a three-dimensional view of the monoblock battery case showing both the base and the lid.
Figure 3B:
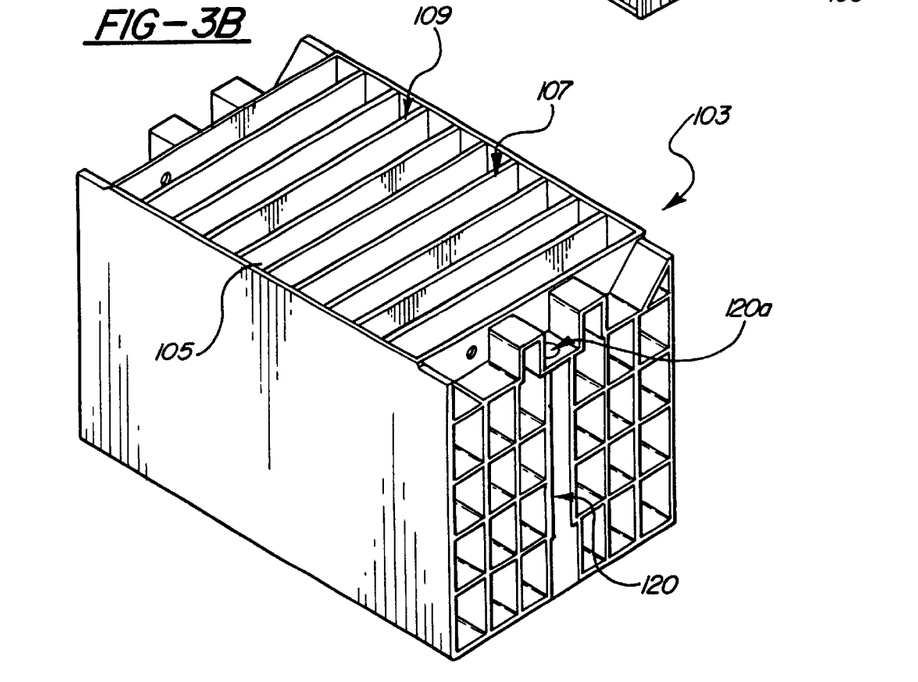
FIG. 3b is a three-dimensional view of the base for a monoblock battery case.

An embodiment of a monoblock case is shown in FIGS. 3a and 3b. FIG. 3a shows the monoblock case having a base 103 and a lid 104. FIG. 3b shows the base 103 without the lid. As shown in FIG. 3b, the base includes two sides, two ends and one bottom. The specific monoblock battery case shown may be suitable for use with prismatic electrochemical cells. The ends of the monoblock battery case are designed so that the electrochemical cells are held in the case under compression so as to minimize the bulging of the battery base. As shown in FIG. 3b, the ends may be formed as a rectangular honeycomb. Partitions are placed into the interior of the monoblock to form the individual enclosures for each of the electrochemical cells. Enclosures may be formed by two partitions or between a partition and a side wall. The interior of the monoblock base is divided into the cell compartments 105. Each cell compartment 105 houses a single electrochemical cell. It is noted that battery electrolyte cannot pass from one cell compartment to any other cell compartment. However, battery gasses can pass from one cell compartment to another.

The partitions may be either "fixed" or "insertable". Partitions that are fixed are typically integrated into the base during manufacturing and cannot be removed. Partitions that are insertable may be placed into the base after the base is manufactured. They may also be removed after they are inserted.

Preferably, the monoblock battery case of the present invention has at least one insertable partition. Specifically, an embodiment of the present invention is a plastic monoblock prismatic battery case having at least one insertable partition. This insertable partition may be adapted to be operatively disposed between either two sides of the monoblock case so as to cooperate with either the walls of the case or with fixed partitions or with other insertable partition so as to form an enclosure for one or more electrochemical cells.

It is noted that insertable partitions may be manufactured so as to "cooperate" with either an adjacent wall or an adjacent partition (either fixed or insertable) so that there is a substantially uniform compression of the electrochemical cell that is placed in between the two. For example, an insertable partition may be manufactured to compensate for the "draft angle" of the fixed paction or wall that was integrally manufactured with the base. (The "draft angle" in the base are required for manufacturability so that the base can be separated from the mold). The insertable partition may be made to taper in an opposite manner to the fixed partition or wall. This results in an more even compression across the surface of the electrochemical cell.

Partitions may be divider partitions or coolant partitions. Divider partitions serve to divide the case into smaller regions and form the enclosures discussed above. Coolant partitions, in addition to forming enclosures, also serve to cool the electrochemical cells.

Preferably, the divider partitions are integrated into the monoblock base and are "fixed" while the coolant partitions are "insertable". However, it is possible that all partitions may be insertable thereby allowing for greater flexibility of the monoblock case design.

In the embodiment shown in FIG. 3b, the divider partitions 107 are fixed while the coolant partitions 109 are insertable. Because the coolant partitions may be inserted into the monoblock base after the base is manufactured, the walls of the coolant partitions can be made thinner thereby providing for increased cooling capabilities. As well, because the coolant partition are insertable, they may be adapted to provide for a substantially uniform compression of the electrochemically cells (as discussed above).

Each of the coolant partitions 109 includes a system of coolant channels which are preferably integrated into the coolant partitions. The coolant channels are more preferably integrated into the interior of the coolant partitions. The coolant partitions are disposed between and in thermal contact with the electrochemical cells. The coolant channels of each of the coolant partitions are fluidly connected to coolant channels of the other coolant partitions thus forming a integrated cooling system capable of carrying a coolant that can cool the electrochemical cells.

Figure 4:
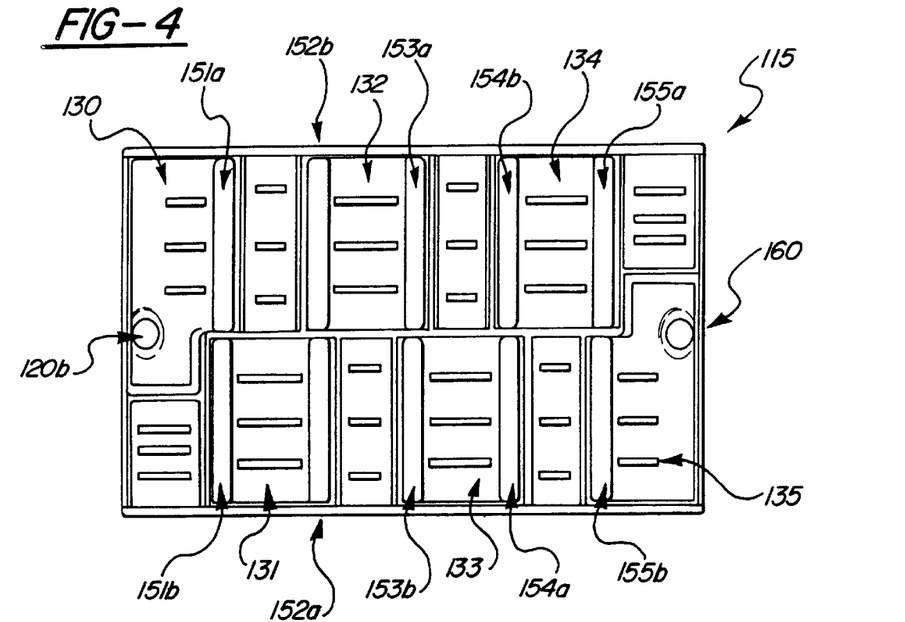
FIG. 4 is a planar bottom view of the monoblock battery base.

Coolant enters and exits each of the coolant partitions 107 though a corresponding partition inlet and a corresponding partition outlet located on the bottom of the monoblock base (referred to herein as the "base bottom". FIG. 4 shows an embodiment of a base bottom.

Referring to FIG. 4, the coolant enters the monoblock base via the inlet tube entrance 120a shown in FIG. 3 and is carried to the can bottom via the inlet tube 120 that is also shown in FIG. 3. The coolant is transported via the inlet tube 120 where it exits the inlet tube exit 120b at the can bottom 115. The coolant is channeled to the first partition inlet 151a. The coolant enters the first partition inlet 151a by way of bottom coolant channel 130, circulates through the first coolant partition, and exits the first coolant partition through a first partition outlet 151b. After exiting the first partition outlet 151b, the coolant is channeled to the second partition inlet 152a via the bottom coolant channel 131 where it circulates through a second coolant partition and exits the second partition outlet 152b. After exiting the second partition outlet 152b, the coolant is channeled to the third partition inlet 153a via the bottom coolant channel 132 where it enters a third coolant partition and exits the third partition outlet 153b. This process is repeated for the other partition inlets and outlet 154a,b and 155a,b and the other bottom coolant channels 133 and 134. After the coolant exits the last partition outlet 155b it is channeled to an outlet tube entrance 160 where it is carried away by an outlet tube. The inlet tube 120 and the outlet tube 160 are examples of coolant inlet and outlet fittings.

It is noted that the openings provided by the partition inlets and outlet facilitate the manufacturing of the monoblock base, since the cans are preferably manufactured by an injection molding process. The opening permits greater stability of the mold cavity tooling during manufacturing providing for tighter dimensional tolerances thus facilitating battery assembly. It also provides an excellent sealing surface for the coolant partitions that are inserted into the openings.

Figure 5:
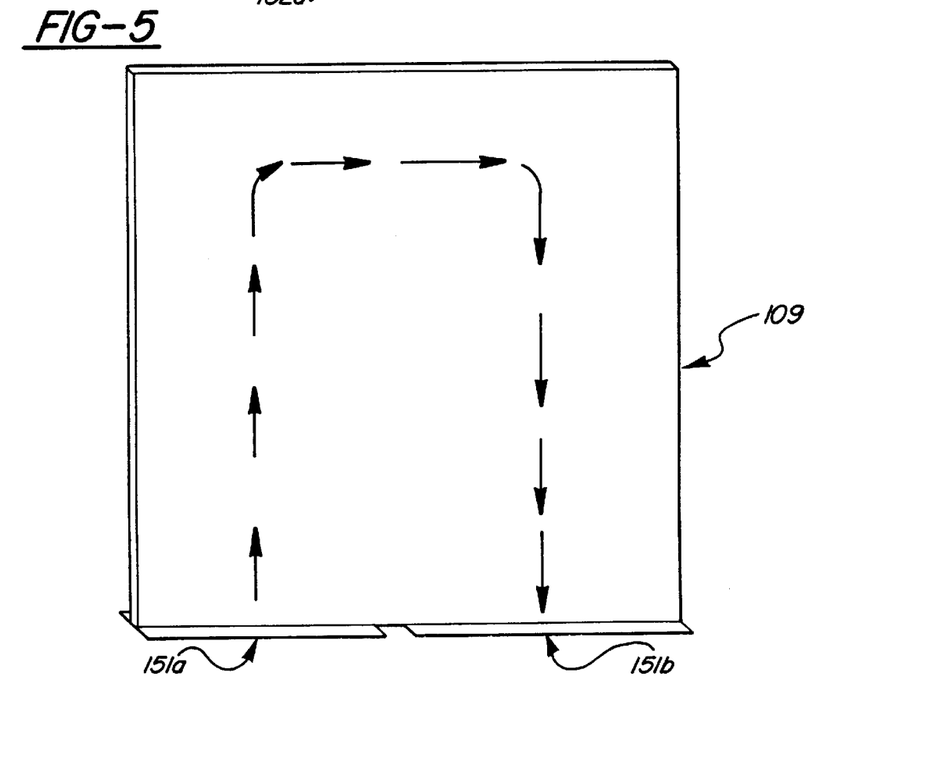
FIG. 5 is a side view of a coolant partition showing the path of coolant flow through the coolant channels.

It is noted that the coolant can be made to circulate through each of the coolant partitions in many different ways. One example of a circulation scheme is to have the coolant, after entering the coolant partition via the partition opening, go up one side of the coolant partition, across the top of the partition, and down the other side of the partition (where it then exits via the partition exit). The type of circulation path is shown in FIG. 5. FIG. 5 shows a coolant partition 109 that is placed over the partition inlet 151a and coolant outlet 151b. The arrows show the general path of the coolant.

This is an example of a "closed loop" scheme. Closed loop intercell cooling may be used between every cell or at regular intervals, such as between every second or every third cell. The coolant may be routed either horizontally in a serpentine method between and around cells, or vertically, in a "semi-corkscrew" path, up and down the cells through the hollow wall of the coolant partitions, and then through passages under or above the cells. Alternately, air flow paths may be molded into the walls between the cells in a vertical or horizontal orientation.

As seen from FIG. 4, the partition outlet of one coolant partition is fluidly connected to the partition inlet of another coolant partition. In the particular connection scheme shown in FIG. 4, the bottom coolant channels are routing the coolant so that it must enter and exit the first partition before entering the second, as so on. This is a "serial" connection. Other routing schemes are also possible. For example, the coolant may be channeled so that it enters all of the partitions at essentially the same time. This is a "parallel" connection.

It is also noted that the coolant may be either a liquid coolant or a gaseous coolant. As used herein "fluid" refers to either a liquid or a gas. Examples of liquid coolants are water or a water/glycol mixture. An example of gaseous coolant is air.

Figure 6:
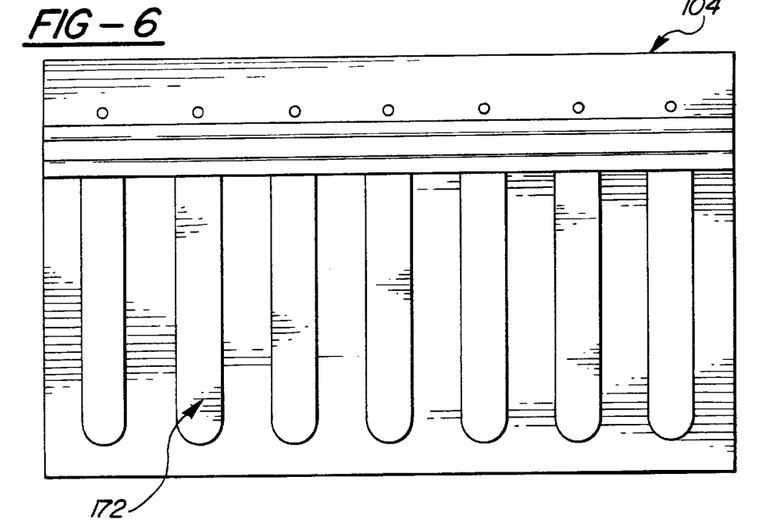
FIG. 6 is a top view of the lid of a monoblock battery case.

The monoblock battery case comprises a case lid. FIG. 6 shows a top view of an embodiment of the upper lid of a monoblock battery case. Referring to FIG. 6, the upper lid 104 comprises a plurality of gas channels 172. Each gas channel is disposed on top of an individual electrochemical cell. The gas channels communicate with one another such that the gases from each cell are collected and vented through the same vent or vents.

The gas channels are also designed to prevent electrolyte communication from one of the enclosures to another. This may be accomplished by the inclusion of a gas permeable hydrophobic material such that gas is able to vent from the enclosure but the electrolyte cannot. The hydrophobic material has a gas diffusion surface area sufficient to compensate for the overcharge gas evolution rate. The may be from about 5 $cm^2$ to about 50 $cm^2$ per 12 Ah cell. Generally, the hydrophobic material is any material which allows passage of the battery gases but not the battery electrolyte. Examples of materials are materials comprising polyethylene with calcium carbonate filler. Other examples include many types of diaper material.

Figure 7:
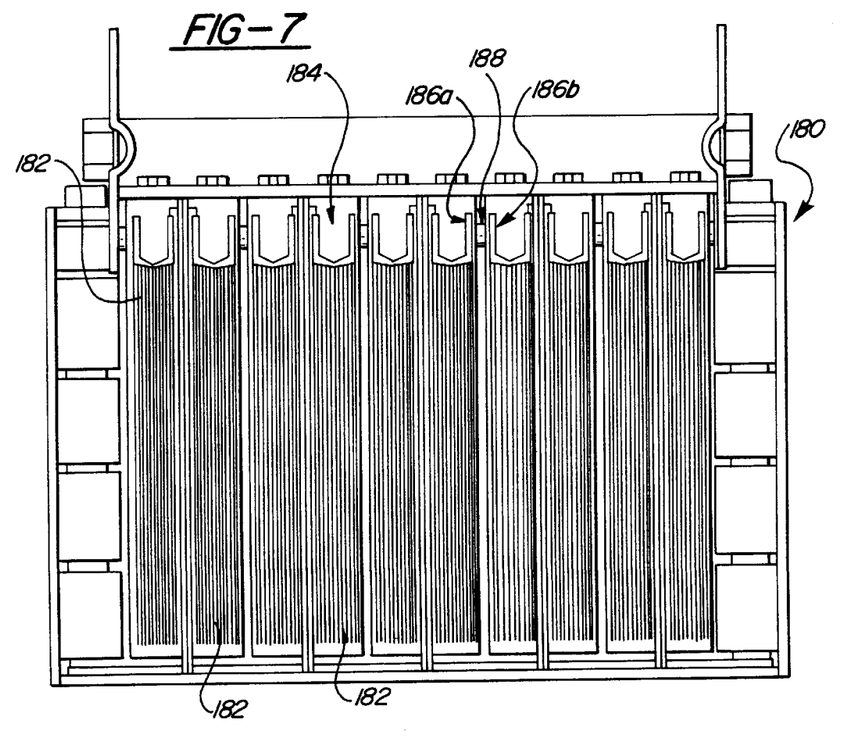
FIG. 7 is a side view of a monoblock battery showing how electrodes are interconnected through the walls of the partitions.

Each of the electrochemical cells in the monoblock battery comprises at least one positive and at least one negative electrode. The electrodes include current collection tabs attached to the electrodes for transporting electrical energy into and out of the electrodes. FIG. 7 is a side view of the monoblock battery 180. Shown in FIG. 7 is a "stack" of positive and negative electrodes 182 which have been placed in an individual cell compartment 184 (i.e, an enclosure). The plurality of electrochemical cells may be serially electrically interconnected together. This may be done by electrically connecting the current collection tabs through the partitions. The connections can be made by welding the current collection tabs of the positive electrodes 186a of one of the cells to the current collection tabs of the negative electrode 186b of an adjacent cell. The welding may be done by resistance welding a connection spacer 188 between the current collection tabs 186a, 186b of the electrodes. The connection spacer 188 was described above with regards to the other embodiments of the monoblock battery.

The region of interconnection through the partition may be sealed to prevent electrolyte communication from one of the cell compartments (i.e., one of the enclosures) to another cell compartment (i.e., another of the enclosures). The sealing may be accomplished by using a polymer gasket such as a EPDM gasket. The interconnection region seal may further include a hot melt adhesive or an epoxy adhesive.

Generally, the electrochemical cell may be any type of electrochemical cell. The cell may be a nickel-metal hydride cell comprising negative electrodes including hydrogen storage materials as the active material, and positive electrodes including nickel hydroxide active material.

A plastic monoblock battery case for a prismatic battery was described above. Placed within the battery case is a plurality of individual electrically connected electrochemical cells. The case has integrally formed sides and bottom walls. Furthermore, "insertable" partitions have also been discussed above. Disclosed herein is a plastic monoblock prismatic battery case comprising at least one insertable partition. The insertable partition is adapted to be operatively disposed between two side walls of the battery case so as to cooperate with the side walls of the case or to cooperate with another paction to form an enclosure of one or more of the electrochemical cells.

The insertable partition may include integrally formed coolant channels for fluid coolant. The coolant surfaces may be integrated internally within the insertable partition. The coolant channels may be formed internally of the partition surfaces.

The insertable partition may have opposed planar surfaces against which an electrochemical cell is adapted to abut. The side walls of the prismatic monoblock prismatic battery case and the surfaces of the partition, when the partition is operatively disposed within the case, cooperate to substantially uniformly compress the electrochemical cells situated therebetween.

Also disclosed herein is a fluid cooled, plastic battery case where the improvement comprises passing coolant from a coolant channel in the bottom of the plastic case up through coolant channels which cool a portion of one surface of at least one electrochemical cell, across the surface and down through coolant channels which cool the remainder of the one surface of the at least one cell, and out to another coolant channel in the bottom of the plastic case.

Also disclosed herein is a high capacity, high energy battery module including a plurality of individual prismatic electrochemical cells, enclosed within a case, at least two sets of two of the cells being electrically interconnected in parallel and each of the sets of parallel interconnected cells being electrically interconnected to each other in series. The high surface area of the sides of the prismatic cells may be in intimate thermal contact with one another to prevent thermal runaway during charging of the module.

While the present invention has been described in conjunction with specific embodiments, those of normal skill in the art will appreciate the modifications and variations can be made without departing from the scope and the spirit of the present invention. Such modifications and variations are envisioned to be within the scope of the appended claims.

We claim:

1. A multi-cell, plastic, nickel-metal hydride monoblock battery, comprising:
   a battery case including one or more partitions dividing the interior of said case into a plurality of cell compartments;
   a plurality of nickel-metal hydride batteries disposed within said case; and
   one or more coolant channels integrally formed with at least one of said partitions, said channels disposed between at least two of said electrochemical cells.

2. The multi-cell, monoblock battery of claim 1, wherein said coolant channels are formed within the interior of at least one of said partitions.

3. The multi-cell, monoblock battery of claim 1, wherein said battery case comprises side walls, a case bottom, and a case lid.

4. The multi-cell, monoblock battery of claim 1, wherein each of said electrochemical cells includes at least one positive electrode, at least one negative electrode and electrolyte.

5. The multi-cell, monoblock battery of claim 1, wherein each of said coolant channels has an inlet and an outlet in said case bottom.

6. The multi-cell, monoblock battery of claim 1, wherein said battery case further includes a plurality of gas channels, said gas channels cooperating with one another so that gases from each of said electrochemical cells are collected and vented through one or more common vents.

7. The multi-cell, monoblock battery of claim 6, wherein said gas channels are adapted to prevent electrolyte communication from one cell compartment to another.

8. The multi-cell, monoblock battery of claim 6, wherein said gas channels comprise a gas permeable hydrophobic material.

9. The multi-cell, monoblock battery of claim 8, wherein said hydrophobic material has a gas diffusion surface area between 5 $cm^2$ and 50 $cm^2$ per 12 Ah of cell capacity.

10. The multi-cell, monoblock battery of claim 9, wherein said hydrophobic material comprises polyethylene with calcium carbonate filler.

11. The multi-cell, monoblock battery of claim 1, wherein said said electrochemical cells are electrically interconnected.

12. The multi-cell, monoblock battery of claim 1, wherein said plurality of electrochemical cells are electrically interconnected through said partitions.

13. The multi-cell, monoblock battery of claim 12, wherein said interconnection includes a seal to prevent electrolyte communication from one of said cell compartments to another.

14. The multi-cell, monoblock battery of claim 12, wherein a connection spacer is electrically coupled between adjacent electrically interconnected cells.

15. The multi-cell, monoblock battery of claim 14, wherein said connection spacer comprises a material selected from the group consisting of nickel, a nickel alloy, copper, and a copper alloy.

16. The multi-cell, monoblock battery of claim 14, wherein said connection spacer comprises a material selected from the group consisting of nickel, and nickel alloy.

17. The multi-cell, monoblock battery of claim 14, wherein said connection spacer comprises a copper central portion surrounded by nickel.

18. The multi-cell, monoblock battery of claim 14, wherein said connection spacer comprises a copper cylinder wrapped with a nickel wire.

19. The multi-cell, monoblock battery of claim 13, wherein said seal includes a polymer gasket.

20. The multi-cell, monoblock battery of claim 13, wherein said seal includes an element selected from the group consisting of a hot melt adhesive, and an epoxy adhesive.

21. The multi-cell, monoblock battery of claim 4, wherein the negative electrodes of each electrochemical cell include hydrogen storage active material and the positive electrodes of each electrochemical cell include nickel hydroxide active material.

22. The multi-cell, monoblock battery of claim 1, wherein said partitions are adapted to provide substantially uniform compression of said electrochemical cells.

23. The multi-cell, monoblock battery of claim 1, wherein said coolant channels house a coolant selected from the group consisting of liquid, and gas.

24. The multi-cell, monoblock battery of claim 1, wherein each of said electrochemical cells is disposed in a separate cell compartment.

25. The multi-cell, monoblock battery of claim 1, wherein said cell compartments are in gaseous communication.

26. The multi-cell, monoblock battery of claim 1, wherein gases from each of said electrochemical cells are shared in a common pressure region within said battery case.

* * * * *

UNITED STATES PATENT AND TRADEMARK OFFICE
CERTIFICATE OF CORRECTION

PATENT NO.   : 6,255,015 B1
DATED        : July 3, 2001
INVENTOR(S)  : Dennis A. Corrigan, Philippe Gow, Lin R. Higley, Marshall D. Muller,
               Anthony Osgood, Stanford R. Ovshinsky, Joshua Payne and Rajeev Puttaiah

It is certified that error appears in the above-identified patent and that said Letters Patent is hereby corrected as shown below:

Column 15,
Line 51, "a plurality of nickel-metal hydride batteries" should read -- a plurality of nickel-metal hydride electrochemical cells --

Signed and Sealed this

Second Day of July, 2002

*Attest:*

JAMES E. ROGAN
*Director of the United States Patent and Trademark Office*

*Attesting Officer*